March 12, 1957 L. H. MORIN 2,784,474
REVERSE SPRING LOCK MEANS FOR TWO-WAY SEPARATORS AND SLIDERS
Filed Oct. 26, 1950 2 Sheets-Sheet 2
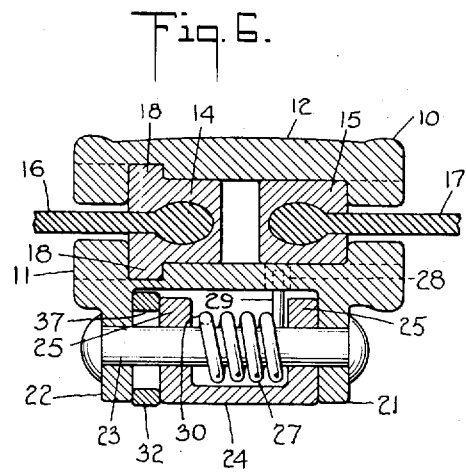
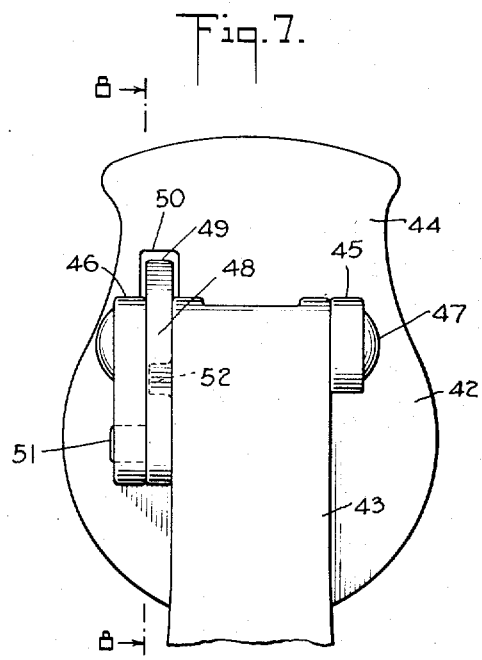
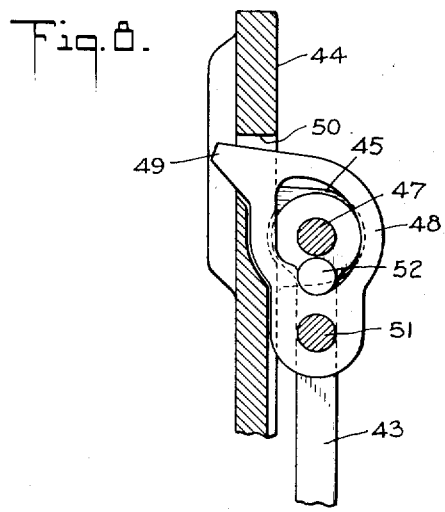
INVENTOR
LOUIS H. MORIN
BY
*Howard E. Thompson*
ATTORNEY

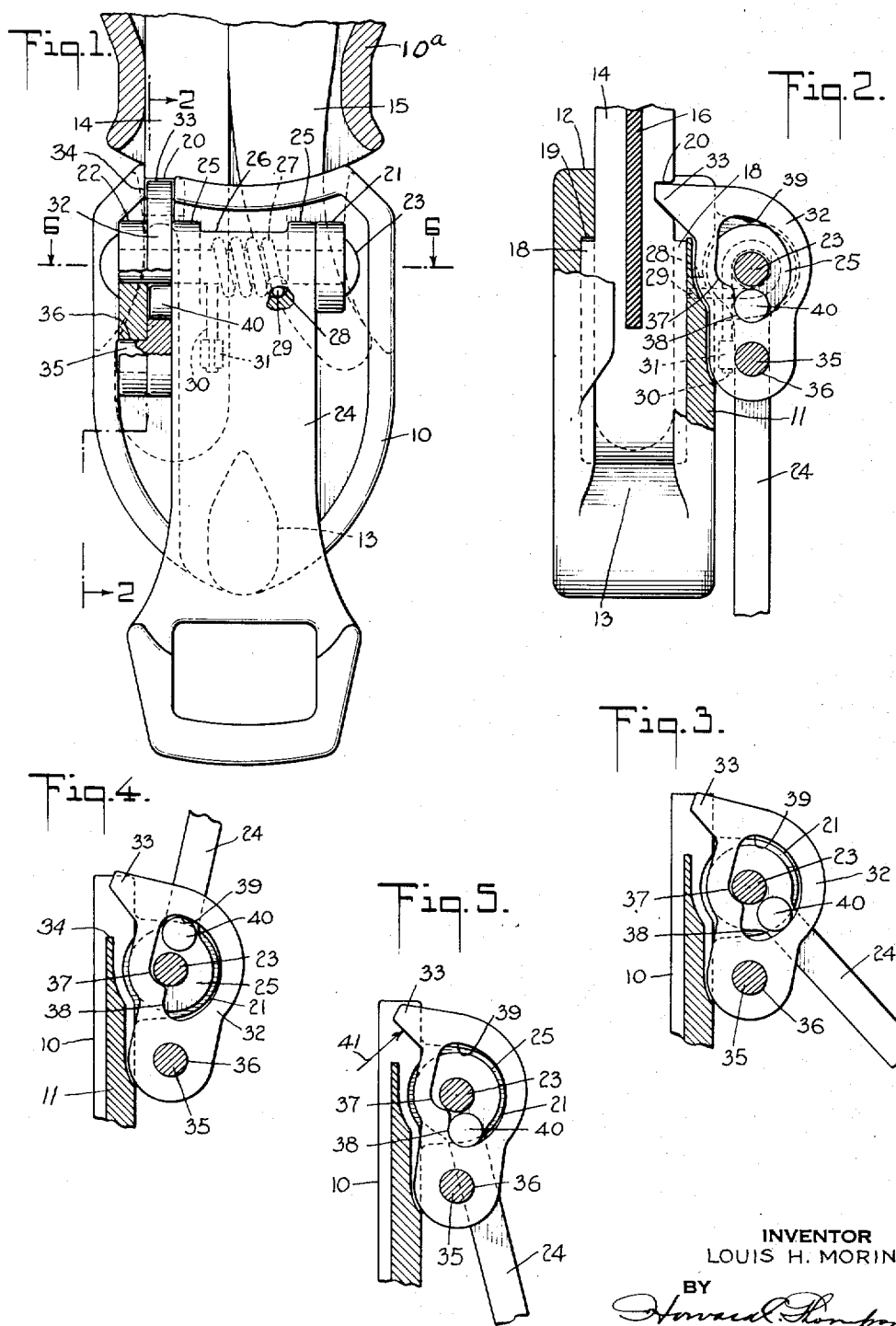

United States Patent Office 2,784,474
Patented Mar. 12, 1957

2,784,474

REVERSE SPRING LOCK MEANS FOR TWO-WAY SEPARATORS AND SLIDERS

Louis H. Morin, Bronx, N. Y.

Application October 26, 1950, Serial No. 192,240

10 Claims. (Cl. 24—205.11)

This invention relates to separable fasteners employing stringers with two-way separators or sliders arranged on the stringers for controlling operation of the stringers and separation thereof. More particularly, the invention deals with a reversible spring locking means in the form of a pawl for retaining the separator or slider against accidental movement on the stringers, while facilitating normal operation of the separator or slider along the stringers.

The novel features of the invention will be best understood from the following description, when taken together with the accompanying drawings, in which certain embodiments of the invention are disclosed and, in which, the separate parts are designated by suitable reference characters in each of the views and, in which:

Fig. 1 is a plan view of a two-way separator showing part of the stringer structure, with parts of the construction broken away and in section.

Fig. 2 is a side view of the structure seen in Fig. 1 showing part of the construction in section, the section being on the line 2—2 of Fig. 2.

Fig. 3 is a view similar to Fig. 2 showing only part of the construction, with parts in a different position.

Fig. 4 and Fig. 5 are views similar to Fig. 3, showing parts in different positions.

Fig. 6 is a section on the line 6—6 of Fig. 1.

Fig. 7 is a plan view of a slider construction with one of my improved reverse lock pawls thereon and omitting the stringer, and with part of the structure broken away; and Fig. 8 is a partial section on the line 8—8 of Fig. 7.

In Figs. 1 to 6 inclusive, I have shown, at 10, the box member of a two-way separator, generally of the type and kind disclosed in my prior application, Serial Number 169,339, filed June 21, 1950. The box member 10 comprises a top plate 11, bottom plate 12, these plates being joined by a connecting web 13 at the contracted end thereof, the web dividing the box member into two channels for receiving pin members 14 and 15 at one end of a pair of stringers 16 and 17.

The pin member 14 has laterally extending shoulders 18, note Fig. 2, engaging stop walls 19 in checking movement of the pin member 14 in one direction. The pin member 14, above one of the shoulders 18, has a recess 20, for purposes later described. On the wall 11 of the box member 10 are outwardly projecting bearings or clevices 21 and 22, the bearing 22 being longer than the bearing 21, as will clearly appear from a consideration of Fig. 1 of the drawing.

Passed through the bearings 21, 22 is a pivot pin 23, on which is pivotally mounted a pull 24, the pull having bearing portions 25 engaging the pin and between the bearing portions is a hood portion 26, which conceals a coil spring 27 arranged on the pin 23.

The wall 11 has an aperture 28 which receives one end 29 of the spring; whereas the other end 30 of the spring is fixed to the undersurface of the pull 24 in any suitable manner at 31. The spring 27 is tensioned to normally maintain the pull upon the wall 11, or in the position indicated in Figs. 1 and 2 of the drawing.

At 32 I have shown a lock element having a pin or pawl end 33 which passes through an aperture 34 in the wall 11, so as to enter the channel of the body 10 to engage the stringer scoops when body 10 is moved upwardly along the stringers. As illustrated in Fig. 2, of the drawing, the pawl is adapted to enter the recess 20 of the pin member 14 in retaining the box member 10 locked to the pin members or end coupling members 14, 15.

The element 32 includes an outwardly projecting integral pin 35 which operates in an aperture 36 in the bearing 22, thus the element 32 has a fixed pivotal mounting upon the body 10. The element 32 has an irregular-shaped aperture 37 extending therethrough, which can be defined as having a restricted portion 38 and an enlarged more or less heart-shaped portion 39.

The fingerpiece or pull 24 has an outwardly offset pin or lug 40 which operates in the aperture 37 and, in the normal locked position of the parts, is positioned within the reduced portion 38 of the aperture, as clearly seen in Fig. 2 of the drawing. However, in moving the pull 24 upwardly, in the manner illustrated in Fig. 3 of the drawing, the pawl end 33 of the element 32 will be raised to clear the pin member 14 and scoops of a stringer to allow free movement of the box member 10 along the stringers in moving the box member in one direction. However, in moving the box member 10 in the other direction, the pull 24 can be swung to the position shown in Fig. 4, in which position the pawl end 33 is still maintained in its raised inoperative position.

In Fig. 5 of the drawing, I have shown the position of the parts when the pawl end 33 of the element 32 may ratchet over the stringer scoops, in which operation, the scoops actuate on the pawl end 33 in the direction of the arrow 41.

It will be understood that the pin members 14 and 15 are free to pass downwardly through the box member 10 at opposite sides of the web 13 in movement of the box member along the stringers and, further, that the pin member 15 can be removed from, or inserted into, the box member when the pin member 14 is in the position shown in Figs. 1 and 2, that is, when a conventional slider 10a, Fig. 1, preferably of the locking type, is in abutting engagement with the box member 10.

In Figs. 7 and 8 of the drawing, I have shown at 42 a slider with a reverse mounting of the fingerpiece of a pull 43 thereon. The top wall 44 of the slider has a pair of bearings 45 and 46, similar to the bearings 21 and 22, for receiving a pivot pin 47, pivoting the pull 43 to the slider in the same manner as pivoting the pull 24. In other words, the pull 43 has the same spring coupling with the slider 42 as the pull 24 has with the box member 10 and, for this reason, no further detailed description will be given.

At 48 is shown a lock element having a pawl end 49 and, here again, the lock element is of the same structure as the element 32, the pawl end 49 operating in an aperture 50 in the top wall 44 of the slider. At 51 is shown the pivot pin portion of the element 48 for pivotal coupling with the bearing 46 and, at 52, is indicated the pin or lug on the pull 43 engaging the element 48.

In Fig. 8 of the drawing, the parts are indicated in the normal position, similar to the showing in Fig. 2 of the drawing. The operation of the slider along the stringers of a separable fastener will be the same as the operation of the box member 10, the pawl 49 operating to reversely lock or hold the slider on the stringers.

Devices of the kind under consideration are adapted for use on various types and kinds of apparel and articles, wherein reverse locking is required to retain the separable fastener against accidental opening when subjected to opening stresses or strains. One use of devices of the kind under consideration is on leggings, but many other uses prevail.

The difference between reverse locking and the normal locking of sliders, or similar members on stringers is that, in normal locking, the pull is tensioned to extend in the direction of the contracted end of the channel body; whereas, in reverse locking the pull is tensioned to extend in the direction of the wide end of the channel body having the diverging channels therein.

The box 10 and slider 42 may be said to comprise channelled members movable along stringers to couple and uncouple the same. The irregular apertures in the lock elements 32—48 form cam surfaces engaged by the pins or lugs 40—52 of the pulls 24—43 in controlling movement of the lock elements 32—48 into inoperative positions.

The pulls and lock elements both have fixed pivotal mountings on the channelled members and said pulls and elements have cooperating means controlling movement of the lock elements.

Having fully described my invention, what I claim as new and desire to secure by Letters Patent is:

1. The combination with a channelled member having a single channel end and a diverging channel end, of a lock element pivotally connected at one end thereof to said member and having a projecting lock pawl adapted to extend into the channel of said member, tensionally actuated means pivotally supported on the member independently of the first named pivot, tension means for operating said last named means, said tensionally actuated means having a part engaging the lock element to normally support the lock pawl thereof so as to extend in the channel of said member, and said tensionally actuated means being biassed to normally extend over the diverging channel end of the member, said lock element having means engaged by said part for moving the lock pawl out of said channel.

2. A movable channelled member for separable fastener stringers having upper and lower walls connected by a web, said walls and web serving to define a pair of channels which intersect within said member, said upper wall having a pair of spaced lugs projecting therefrom, a pull disposed between said lugs and a pin for pivoting the pull to the lugs, a spring on the pull for biassing the latter down over said member, a lock element on said pin disposed between the pull and one of said lugs, one end of said lock element having a projection movable into and out of said channel and the other end of the lock element being pivotally secured to said member, a cut-out in the lock element defined by camming surfaces, a pin on said pull extending into said cut-out for engagement with said camming surfaces, whereby movement of the pull about its pivot is effective to swing the lock element about the pivot of the latter and to move said projection into and out of said channel.

3. A movable channelled member for separable fastener stringers having upper and lower walls connected by a web, said walls and web serving to define a pair of channels which intersect within said member, said upper wall having a pair of spaced lugs projecting therefrom, a pull disposed between said lugs and a pin for pivoting the pull to the lugs, a spring on the pull for biassing the latter down over the web end of said member, an apertured extension on one of said lugs, a lock element on said pin disposed between the pull and said last-mentioned lug, said lock element having a projection on one end movable into and out of said channel, a pin on the lock element adjacent the other end pivotally mounted in said lug aperture, a cut-out in the lock element intermediate the projection and pin thereon and defined by camming surfaces, and a pin on said pull extending into said cut-out for engagement with said camming surfaces, whereby movement of the pull about the pull pivot pin is effective to swing the lock element about the pivot pin of the latter and to move said projection into and out of said channel.

4. A movable box member for separable fastener stringers having detachable bottom coupling parts comprising a channelled member having upper and lower walls connected by a web, said walls and web serving to define a pair of channels which intersect above the web, a recessed portion on the inner surface of both said upper and lower walls extending from a point adjacent the web to a point adjacent the opposite end of said member, said recessed portion serving to receive one of said coupling parts to prevent the member from sliding off the lower end of said one coupling part, said upper wall having a pair of spaced lugs projecting therefrom, a pull disposed between said lugs and a pin for pivoting the pull to the lugs, a spring on the pull for biassing the latter down over the web end of said member, an apertured extension on one of said lugs, a lock element on said pin disposed between the pull and said last-mentioned lug, said lock element having a projection on one end movable into and out of said channel, a pin on the lock element adjacent the other end pivotally mounted in said lug aperture, a cut-out in the lock element intermediate the projection and pin thereon and defined by camming surfaces, a pin on said pull extending into said cut-out for engagement with said camming surfaces, whereby movement of the pull about the pull pivot pin is effective to swing the lock element about the pivot pin of the latter and to move said projection into and out of said channel.

5. In separable fastener stringers having detachable bottom coupling parts, a movable box member, and a slider, the improvement comprising a box member having upper and lower walls connected by a web, said walls and web serving to define a pair of channels which intersect above the web, said box member being movable along the coupled stringers with the coupling parts being slidable through said channels, interengaging means on one of said coupling parts and on said box member for preventing the latter from sliding off the lower end of said one coupling part, said interengaging means comprising a recessed portion on the inner surface of both said upper and lower walls extending from a point adjacent the web to a point adjacent the opposite end of said member, and a projecting portion on said one coupling part adapted to be received in said recessed portion, said upper wall having a pair of spaced lugs projecting therefrom, a pull disposed between said lugs and a pin for pivoting the pull to the lugs, a spring on the pull for biasing the latter down over the web end of said member, an apertured extension on one of said lugs, a lock element on said pin disposed between the pull and said last-mentioned lug, said lock element having a projection on one end movable into and out of said channel, a pin on the lock element adjacent the other end pivotally mounted in said lug aperture, a cut-out in the lock element intermediate the projection and pin thereon and defined by camming surfaces, a pin on said pull extending into said cut-out for engagement with said camming surfaces, whereby movement of the pull about the pull pivot pin is effective to swing the lock element about the pivot pin of the latter and to move said projection into and out of said channel.

6. A movable channeled member for separable fastener stringers having a pull pivotally mounted thereon, a spring engaging the pull and said member for biasing the pull along said member, a lock element on said member disposed along one side edge of the pull and having a locking portion movable into and out of said channel, said lock element being pivotally secured to said member independently of the pull, a cut-out in the lock element defined by camming surfaces, and a pin extending from said side edge of the pull and into said cut-out for engagement with said camming surfaces, whereby movement of the pull about its pivot is effective to swing the lock element about the pivot of the latter and to move said locking portion into and out of said channel.

7. A movable channeled member for separable fastener stringers having a double channel end and a single channel end, a pull connected to said member and spring-biased to normally extend toward the double channel end of the member, a lock element on said member disposed along one side edge of the pull and having a locking portion movable into and out of said channel, said lock element being pivotally mounted on said member, a cut-out in the lock element defined by camming surfaces, and means extending from said side edge of the pull and into said cut-out for engagement with said camming surfaces, whereby movement of the pull is effective to move said locking portion of the lock element into and out of said channel.

8. In separable fasteners employing stringers, a channelled member movable along a pair of stringers to couple and uncouple the same, means for reversely locking said member on the stringers comprising a pull and a lock element each pivoted to said member, said lock element having a pawl portion adapted to extend into the channel of said member, the pivot point and the pawl portion of the lock element being disposed at opposite end portions thereof, tensional means for actuating the pull to normally support said element in locking position, one end portion of said tensional means engaging said member and the other end portion engaging the pull, said element and pull having cooperating means comprising an irregular aperture in the lock element forming a cam surface thereon and a projecting lug on the pull operating on said cam surface to actuate said element, said aperture being disposed between the pivot point and pawl portion of the lock element and said lock element being releasable from locking position by drawing the pull angularly relatively to the member in an upward or downward direction.

9. A reverse lock channelled member for separable fastener stringers, said member having a double channel end and a single channel end, said member having a pull and a lock element each pivotally connected to said member on independently spaced pivots, said lock element being disposed along a side edge of the pull, the pivot for the lock element being disposed nearer to the double channel end of the member than the pivot for the pull, said element having a lock part adapted to extend into the channel of said member to reversely lock the member on said separable fastener stringers, said lock part and said pull extending in generally opposite directions, cooperating means on said element and pull for controlling movement of the element toward and from said channel, and tensional means for normally retaining the lock part of said element in locking position.

10. A movable channelled member for separable fastener stringers having upper and lower web-connected walls which serve to define a pair of stringer channels, said upper wall having a pair of spaced lugs projecting therefrom, a pull pivoted to said lugs, a spring for biasing the pull down over the web end of said member, a lock element pivoted to one of said lugs and having a projection adapted to be moved into and out of one of said stringer channels, a cut-out in the lock element defined by camming surfaces, and means on said pull engageable with said camming surfaces whereby movement of the pull about its pivot is effective to swing the lock element about its pivot and to move said projection relatively to said stringer channel.

References Cited in the file of this patent
UNITED STATES PATENTS

| | | |
|---|---|---|
| 2,068,503 | Marinsky | Jan. 19, 1937 |
| 2,228,146 | Morin | Jan. 7, 1941 |
| 2,273,773 | Poux | Feb. 17, 1942 |
| 2,303,751 | Marinsky | Dec. 1, 1942 |
| 2,397,693 | Rabinow | Apr. 2, 1946 |
| 2,551,381 | Legat | May 1, 1951 |
| 2,553,230 | Bashover | May 15, 1951 |